United States Patent
Huang et al.

(10) Patent No.: US 10,970,600 B2
(45) Date of Patent: Apr. 6, 2021

(54) METHOD AND APPARATUS FOR TRAINING NEURAL NETWORK MODEL USED FOR IMAGE PROCESSING, AND STORAGE MEDIUM

(71) Applicant: Tencent Technology (Shenzhen) Company Limited, Shenzhen (CN)

(72) Inventors: Haozhi Huang, Shenzhen (CN); Hao Wang, Shenzhen (CN); Wenhan Luo, Shenzhen (CN); Lin Ma, Shenzhen (CN); Peng Yang, Shenzhen (CN); Wenhao Jiang, Shenzhen (CN); Xiaolong Zhu, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 143 days.

(21) Appl. No.: 16/373,034

(22) Filed: Apr. 2, 2019

(65) Prior Publication Data
US 2019/0228264 A1 Jul. 25, 2019

Related U.S. Application Data

(63) Continuation of application No. PCT/CN2018/075958, filed on Feb. 9, 2018.

(30) Foreign Application Priority Data

Mar. 8, 2017 (CN) .......................... 201710136471.9

(51) Int. Cl.
*G06K 9/00* (2006.01)
*G06K 9/62* (2006.01)
(Continued)

(52) U.S. Cl.
CPC ............. *G06K 9/6257* (2013.01); *G06K 9/00* (2013.01); *G06K 9/00711* (2013.01);
(Continued)

(58) Field of Classification Search
CPC .... G06K 9/00; G06K 9/00744; G06K 9/6202; G06K 9/6271; G06N 3/04; G06N 3/0454; G06N 3/08; G06T 5/00
See application file for complete search history.

(56) References Cited

U.S. PATENT DOCUMENTS

| 2015/0063628 | A1* | 3/2015 | Bernal | G06K 9/00771 |
| | | | | 382/103 |
| 2017/0206405 | A1* | 7/2017 | Molchanov | G06K 9/00355 |

(Continued)

FOREIGN PATENT DOCUMENTS

| CN | 104504366 A | 4/2015 |
| CN | 105160310 A | 12/2015 |

(Continued)

OTHER PUBLICATIONS

J. Johnson, A. Alahi, and L. Fei-Fei. Perceptual losses for real-time style transfer and super-resolution. Proc. ECCV, 2016.*
(Continued)

*Primary Examiner* — Li Liu
(74) *Attorney, Agent, or Firm* — Brinks Gilson & Lione

(57) ABSTRACT

A method, apparatus, and storage medium for training a neural network model used for image processing are described. The method includes: obtaining a plurality of video frames; inputting the plurality of video frames through a neural network model so that the neural network model outputs intermediate images; obtaining optical flow information between an early video frame and a later video frame; modifying an intermediate image corresponding to the early video frame according to the optical flow infor-
(Continued)

mation to obtain an expected-intermediate image; determining a time loss between an intermediate image corresponding to the later video frame and the expected-intermediate image; determining a feature loss between the intermediate images and a target feature image; and training the neural network model according to the time loss and the feature loss, and returning to obtaining a plurality of video frames continue training until the neural network model satisfies a training finishing condition.

20 Claims, 7 Drawing Sheets

(51) Int. Cl.
  *G06N 3/04* (2006.01)
  *G06K 9/03* (2006.01)
  *G06N 3/08* (2006.01)
  *G06K 9/46* (2006.01)
  *G06K 9/40* (2006.01)
  *G06T 5/00* (2006.01)
(52) U.S. Cl.
  CPC ......... *G06K 9/00744* (2013.01); *G06K 9/036* (2013.01); *G06K 9/40* (2013.01); *G06K 9/4628* (2013.01); *G06K 9/62* (2013.01); *G06K 9/6202* (2013.01); *G06K 9/6232* (2013.01); *G06N 3/04* (2013.01); *G06N 3/08* (2013.01); *G06T 5/00* (2013.01)

(56) References Cited

U.S. PATENT DOCUMENTS

| | | | | |
|---|---|---|---|---|
| 2017/0308734 | A1* | 10/2017 | Chalom | G06K 9/6267 |
| 2018/0012082 | A1* | 1/2018 | Satazoda | G06K 9/00805 |
| 2018/0190377 | A1* | 7/2018 | Schneemann | G06K 9/00275 |
| 2019/0347485 | A1* | 11/2019 | Yang | G06K 9/00718 |

FOREIGN PATENT DOCUMENTS

| | | |
|---|---|---|
| CN | 106203533 A | 12/2016 |
| CN | 106407889 A | 2/2017 |
| WO | WO2015079470 A3 | 7/2015 |

OTHER PUBLICATIONS

M. Ruder, A. Dosovitskiy, and T. Brox. Artistic style transfer for videos. Proceedings of German Conference on Pattern Recognition, 2016.*

N. Bonneel, J. Tompkin, K. Sunkavalli, D. Sun, S. Paris, and H. Pfister. Blind video temporal consistency. ACM Transactions on Graphics, 34(6): 196, 2015.*

International Search Report and Written Opinion received for PCT Application No. PCT/CN2018/075958 dated May 9, 2018 (with brief English translation), 7 pages.

Taiwanese Office Action regarding Application No. 107107998 dated Mar. 11, 2019 (with concise translation), 6 pages.

Korean Office Action and translation regarding Application No. 10-2019-7021770 dated Jan. 18, 2021, 7 pages.

* cited by examiner

METHOD AND APPARATUS FOR TRAINING NEURAL NETWORK MODEL USED FOR IMAGE PROCESSING, AND STORAGE MEDIUM

RELATED APPLICATION

This application claims priority to PCT Patent Application No. PCT/CN2018/075958, filed on Feb. 9, 2018, which claims priority to Chinese Patent Application No. 201710136471.9, filed with the Chinese Patent Office on Mar. 8, 2017, both of which are incorporated by reference in their entireties.

FIELD OF THE TECHNOLOGY

This application relates to the field of computer technologies, and in particular, to a method and an apparatus for training a neural network model used for image processing, and a storage medium.

BACKGROUND OF THE DISCLOSURE

With the development of computer technologies, in an image processing technology, a neural network model is usually used to perform conversion processing on a feature of an image, such as image color feature conversion, image light and shadow feature conversion, or image style feature conversion. A neural network model used for image processing needs to be trained first before feature conversion processing is performed on the image through the neural network model.

SUMMARY

The present disclosure describes a method for training a neural network model used for image processing. The method includes obtaining, by an electronic device, a plurality of video frames including an early video frame and a later video frame, wherein the early video frame is earlier in time than the later video frame. The electronic device include a memory storing instructions and a processor in communication with the memory. The method includes inputting, by the electronic device, the plurality of video frames through a neural network model so that the neural network model outputs intermediate images corresponding to the plurality of video frames, and obtaining, by the electronic device, optical flow information between the early video frame and the later video frame. The method includes modifying, by the electronic device according to the optical flow information, an intermediate image corresponding to the early video time frame to obtain an expected-intermediate image, and determining, by the electronic device, a time loss between an intermediate image corresponding to the later video frame and the expected-intermediate image. The method further includes determining, by the electronic device, a feature loss between the intermediate images corresponding to the plurality of video frames and a target feature image; and training, by the electronic device, the neural network model according to the time loss and the feature loss, and returning to the act of obtaining a plurality of video frames to continue training until the neural network model satisfies a training finishing condition.

The present disclosure describes an apparatus for training a neural network model used for image processing. The apparatus includes a memory storing instructions and a processor in communication with the memory. When the instructions are executed by the processor, the processor is configured to cause the apparatus to obtain a plurality of video frames comprising an early video frame and a later video frame, wherein the early video frame is earlier in time than the later video frame; and input the plurality of video frames through a neural network model so that the neural network model outputs intermediate images corresponding to the plurality of video frames. When the instructions are executed by the processor, the processor is configured to cause the apparatus to obtain optical flow information between the early video frame and the later video frame; and modify, according to the optical flow information, an intermediate image corresponding to the early video time frame to obtain an expected-intermediate image. When the instructions are executed by the processor, the processor is configured to cause the apparatus to obtain a time loss between an intermediate image corresponding to the later video frame and the expected-intermediate image; and obtain a feature loss between the intermediate images corresponding to the plurality of video frames and a target feature image. When the instructions are executed by the processor, the processor is configured to cause the apparatus to train the neural network model according to the time loss and the feature loss, and return to the step of obtaining a plurality of video frames to continue training until the neural network model satisfies a training finishing condition.

The present disclosure describes a non-transitory computer readable storage medium. The non-transitory computer readable storage medium stores machine readable instructions. When the machine readable instructions are executed by a processor, the machine readable instructions cause the processor to perform obtaining a plurality of video frames comprising an early video frame and a later video frame, wherein the early video frame is earlier in time than the later video frame; and inputting the plurality of video frames through a neural network model so that the neural network model outputs intermediate images corresponding to the plurality of video frames. When the machine readable instructions are executed by a processor, the machine readable instructions cause the processor to perform obtaining optical flow information between the early video frame and the later video frame; and modifying, according to the optical flow information, an intermediate image corresponding to the early video time frame to obtain an expected-intermediate image. When the machine readable instructions are executed by a processor, the machine readable instructions cause the processor to perform determining a time loss between an intermediate image corresponding to the later video frame and the expected-intermediate image; and determining a feature loss between the intermediate images corresponding to the plurality of video frames and a target feature image. When the machine readable instructions are executed by a processor, the machine readable instructions cause the processor to perform training the neural network model according to the time loss and the feature loss, and returning to the step of obtaining a plurality of video frames to continue training until the neural network model satisfies a training finishing condition.

DETAILED DESCRIPTION OF THE DISCLOSURE

To make the objectives, technical solutions, and advantages of this application clearer and more comprehensible, the following further describes this application in detail with reference to the accompanying drawings and embodiments. It should be understood that the specific embodiments described herein are merely used for explaining this application but are not intended to limit this application.

When a neural network model used for image processing that is trained by using a conventional neural network model training method performs feature conversion on a video, because time consistency between video frames is not considered, a large quantity of flickering is introduced, resulting in a relatively bad feature conversion effect of the video.

In view of the above, the embodiments of this application provide a method and an apparatus for training a neural network model used for image processing, and a storage medium. When a neural network model is trained, a time loss and a feature loss are used together as a feedback and adjustment basis to adjust the neural network model, to obtain the neural network model used for image processing through training. When the neural network model is trained, video frames that are adjacent in time are used as input, and an intermediate image corresponding to an early video frame in time sequence is changed according to optical flow information of change from the early video frame in time sequence to a later video frame in time sequence, to obtain an intermediate image anticipated to correspond to the later video frame in time sequence, thereby obtaining the time loss. The time loss reflects a loss in time consistency between the intermediate images respectively corresponding to the video frames that are adjacent in time. When the trained neural network model performs feature conversion on a video, time consistency between the video frames of the video is considered, thereby greatly reducing flickering introduced in a feature conversion process, to improve a conversion effect of feature conversion on the video. In addition, calculation of the neural network model and a capability of a processor of an electronic device are combined together to process a video image, thereby improving a calculation speed of the processor without sacrificing a feature conversion effect of the video image, to generate a better neural network model used for image processing.

Figure 1A:
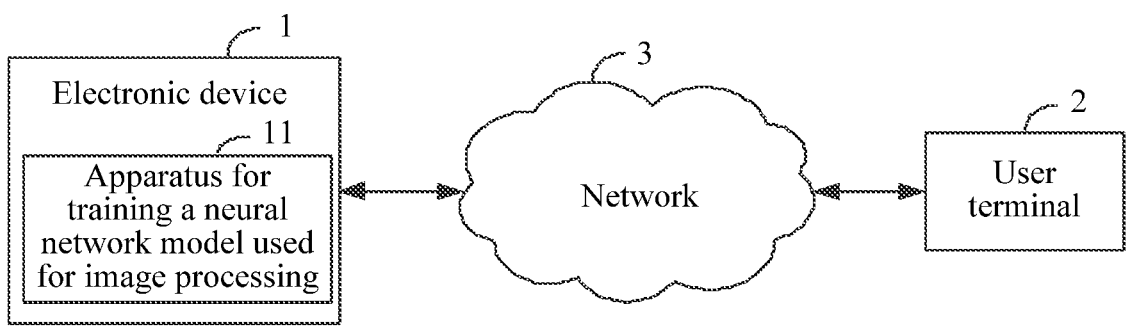
FIG. 1A is a schematic diagram of an implementation environment of a method for training a neural network model used for image processing according to an embodiment of this disclosure.

FIG. 1A is a schematic diagram of an implementation environment of a method for training a neural network model used for image processing according to an embodiment of this application. An electronic device 1 is integrated with an apparatus 11 for training a neural network model used for image processing provided by any embodiment of this application. The apparatus 11 for training a neural network model used for image processing is used for implementing the method for training a neural network model used for image processing provided by any embodiment of this application. The electronic device 1 and a user terminal 2 are connected through a network 3, and the network 3 may be a wired network or a wireless network.

Figure 1B:
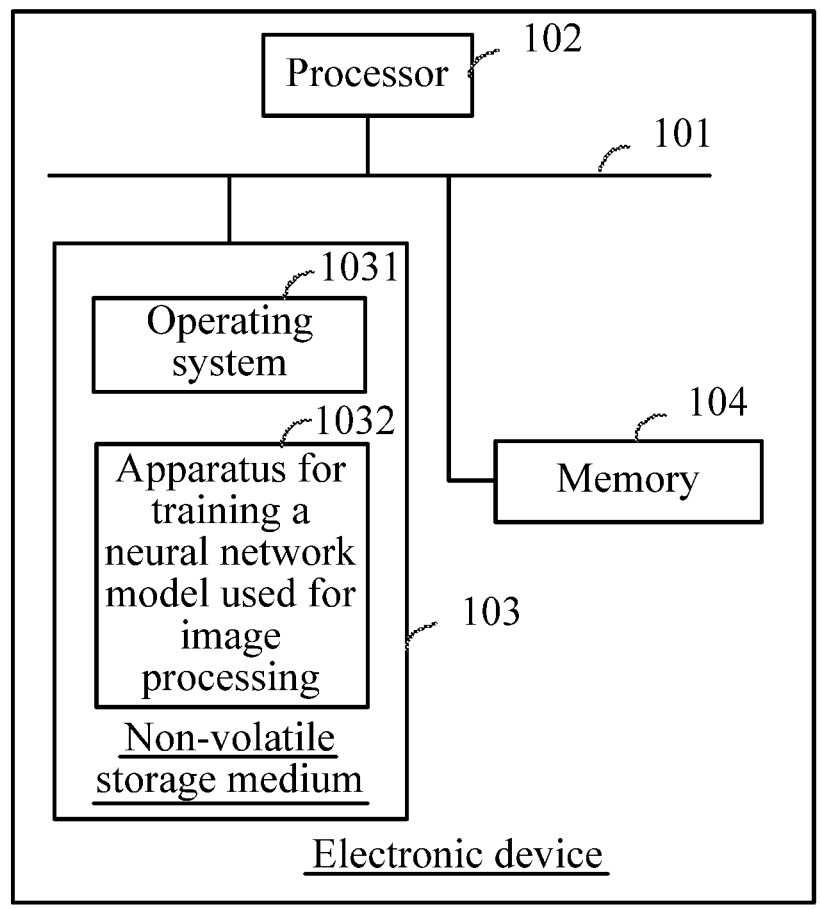
FIG. 1B is a schematic diagram of an internal structure of an electronic device for implementing a method for training

FIG. 1B is a schematic diagram of an internal structure of an electronic device for implementing a method for training a neural network model used for image processing according to an embodiment of this application. Referring to FIG. 1B, the electronic device includes a processor 102, a non-volatile storage medium 103, and a memory 104 connected through a system bus 101. The non-volatile storage medium 103 of the electronic device stores an operating system 1031 and further stores an apparatus 1032 for training a neural network model used for image processing. The apparatus 1032 for training a neural network model used for image processing is configured to implement a method for training a neural network model used for image processing. The processor 102 of the electronic device is configured to provide calculation and control capabilities, to support running of the entire electronic device. The memory 104 in the electronic device provides environment to running of the apparatus for training a neural network model used for image processing in the non-volatile storage medium 103. The memory 104 may store a computer readable instruction. When being executed by the processor 102, the computer readable instruction may cause the processor 102 to perform a method for training a neural network model used for image processing. The electronic device may be a terminal or may be a server. The terminal may be a personal computer or a mobile electronic device. The electronic device includes at least one of a smartphone, a tablet computer, a personal digital assistant, or a wearable device. The server may be implemented by an independent server or a server cluster including a plurality of physical servers. A person skilled in the art may understand that in the structure shown in FIG. 1B, only a block diagram of a partial structure related to a solution in this disclosure is shown, and FIG. 1B does not constitute a limitation to the electronic device to which the solution in this application is applied. Specifically, the electronic device may include more components or fewer components than those shown in FIG. 1B, or some components may be combined, or a different component deployment may be used.

Figure 2:
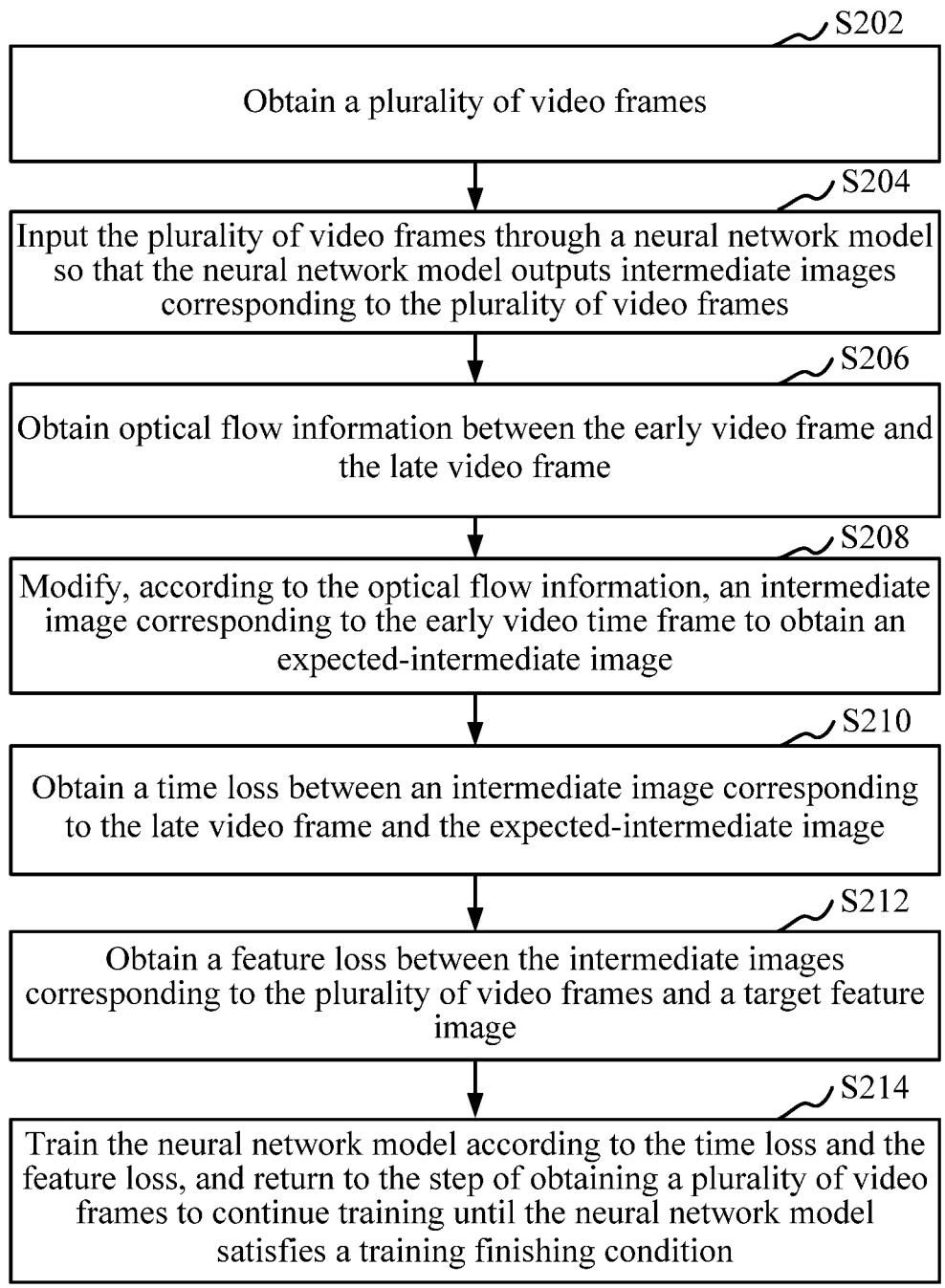
FIG. 2 is a schematic flowchart of a method for training a neural network model used for image processing according to an embodiment of this disclosure.

FIG. 2 is a schematic flowchart of a method for training a neural network model used for image processing according to an embodiment of this application. This embodiment is mainly described by using an example in which the method is applied to the electronic device in FIG. 1B. Referring to FIG. 2, the method for training a neural network model used for image processing specifically includes the following steps.

Step S202: Obtain a plurality of video frames. The plurality of video frames may include an early video frame and a later video frame. The early video frame may be earlier in time sequence than the later video frame that is later in time sequence. In another implementation, the plurality of video frames are adjacent in time. In another implementation, an early video frame and a later video frame may be adjacent in time sequence in the plurality of video frames.

Specifically, a video refers to data that can be segmented into static image sequences arranged in chronological order.

Static images obtained by segmenting the video may be used as video frames. Video frames that are adjacent in time are adjacent video frames in video frames that are arranged in time sequence. The obtained video frames that are adjacent in time may be specifically two or more video frames that are adjacent in time. For example, if the video frames arranged in time sequence are p1, p2, p3, p4 . . . , p1 and p2 are video frames that are adjacent in time, p1, p2, and p3 are also video frames that are adjacent in time.

In an embodiment of this application, a training sample set is provided in the electronic device, the training sample set stores a plurality of groups of video frames that are adjacent in time. The electronic device may obtain any group of video frames that are adjacent in time from the training sample set. The video frames that are adjacent in time in the training sample set may be obtained by the electronic device by segmenting a video obtained from the Internet or may be obtained by the electronic device by segmenting a video recorded by a camera device included in the electronic device.

In an embodiment of this application, a plurality of training sample sets may be provided in the electronic device, and each training sample set is provided with a corresponding training sample set identifier. A user may access the training sample sets by using the electronic device and select a training sample set for training by using the electronic device. The electronic device may detect a selection instruction that is triggered by the user and that carries a training sample set identifier, and the electronic device extracts the training sample set identifier in the selection instruction and obtains video frames that are adjacent in time from the training sample set corresponding to the training sample set identifier.

Step S204: Input the plurality of video frames through a neural network model so that the neural network model outputs intermediate images corresponding to the plurality of video frames. The step of inputting the plurality of video frames through the neural network may include respectively processing the plurality of video frames through the neural network model.

The neural network model is a complex network model formed by connecting a plurality of layers to each other. In this embodiment, the electronic device may train a neural network model, and the neural network model obtained after the training finishes may be used for image processing. The neural network model may include a plurality of feature conversion layers, and each feature conversion layer has a corresponding nonlinear variation operator. Each layer may have a plurality of nonlinear variation operators, and a nonlinear variation operator in each feature conversion layer performs nonlinear variation on an input image, to obtain a feature map as an operation result. Each feature conversion layer receives an operation result of a previous layer, and through operation of the feature conversion layer, outputs an operation result of the layer to a next layer.

Specifically, after obtaining the video frames that are adjacent in time, the electronic device respectively inputs the video frames that are adjacent in time into the neural network model, and the video frames that are adjacent in time sequentially pass through the feature conversion layers of neural network model. On each feature conversion layer, the electronic device performs, by using the nonlinear variation operator corresponding to the feature conversion layer, nonlinear variation on pixel values corresponding to pixels included in a feature map output by a previous layer and outputs a feature map on the current feature conversion layer. If the current feature conversion layer is the first stage feature conversion layer, the feature map output by the previous layer is an input video frame. Pixel values corresponding to pixels may be specifically RGB (Red Green Blue) three-channel color values of the pixels.

For example, in an embodiment of this application, the neural network model that needs to be trained may specifically include three convolution layers, five residual modules, two deconvolution layers, and one convolution layer. After the electronic device inputs the video frames into the neural network model, the video frames first pass through a convolution layer, convolution kernels corresponding to the convolution layer perform a convolution operation on pixel value matrixes corresponding to the input video frames, to obtain pixel value matrixes, that is, feature maps, respectively corresponding to the convolution kernels in the convolution layer, the obtained feature maps are then used as input of a next convolution layer, and nonlinear variation is performed layer by layer, until the last convolution layer outputs feature maps whose quantity corresponds to a quantity of convolution kernels. Then pixel values of corresponding pixel positions in the feature maps are operated according to bias terms corresponding to the feature maps, to obtain a feature map through synthesis as an output intermediate image.

The electronic device may be configured to perform a downsampling operation after a convolution operation is performed on a convolution layer. A downsampling manner may be specifically mean sampling or extremum sampling. For example, the downsampling manner is performing mean sampling on 2*2 pixel areas. Therefore, a pixel value matrix corresponding to a 2*2 pixel area is [1, 2, 3, 4]. Therefore, a pixel value obtained through downsampling is: (1+2+3+4)/4=2.5. A resolution of a feature map obtained after downsampling operation is reduced to ¼ a resolution of an input video frame. Further, the electronic device needs to set an upsampling operation corresponding to the foregoing downsampling operation after a deconvolution operation of the deconvolution layer, so that a resolution of a feature map obtained after the upsampling operation is increased to four times a resolution of the feature map before the upsampling operation, to ensure that the output intermediate image and the input video frames have consistent resolutions.

Quantity of layers included in the neural network model and types of the layers may be adjusted through self-definition or may be adjusted according to a subsequent training result. However, it needs to be satisfied that a resolution of an image input into the neural network model is consistent with that of an image output from the neural network model.

Step S206: Obtain optical flow information between the early video frame and the later video frame. The optical flow information may be optical flow information of change from an early video frame in time sequence to a later video frame in time sequence in the plurality of video frames that is adjacent in time.

The optical flow may represent a movement velocity of a grayscale mode in an image. All optical flows arranged in the image according to spatial positions form an optical flow field. The optical flow field represents a change status of pixel units in the image and may be used for determining movement information of corresponding pixels between images.

In this embodiment of this application, the early video frame in time sequence is a video frame having an earlier timestamp in the video frames that are adjacent in time; the later video frame in time sequence is a video frame having a later timestamp in the video frames that are adjacent in time. For example, the video frames that are adjacent in time are sequentially x1, x2, and x3 in time sequence. Therefore, x1 is the early video frame in time sequence relative to x2 and x3, x2 is the later video frame in time sequence relative to x1, and x2 is the early video frame in time sequence relative to x3.

In this embodiment of this application, the optical flow information of change from the early video frame in time sequence to the later video frame in time sequence may be represented by an optical flow field between the early video frame in time sequence and the later video frame in time sequence. In this embodiment, a manner for calculating the optical flow information may be specifically obtaining, according to an optical flow constraint equation, any one of a differential-based optical flow algorithm, an zone matching-based optical flow algorithm, an energy-based optical flow algorithm, a phase-based optical flow algorithm, and a neurodynamics optical flow algorithm. This is not specifically limited in this embodiment of this application.

Specifically, the electronic device may calculate the optical flow information of change from the early video frame in time sequence to the later video frame in time sequence in the manner for calculating the optical flow information, to obtain an optical flow corresponding to each pixel in the early video frame in time sequence relative to a corresponding pixel in the later video frame in time sequence. The electronic device may also select a feature point from the early video frame in time sequence and calculate an optical flow corresponding to the selected feature point in a sparse optical flow calculation manner. For example, a position of a pixel A in the early video frame in time sequence is (x1, y1), and a position of the pixel A in the later video frame in time sequence is (x2, y2). Therefore, a velocity vector of the pixel A is $\vec{v}=(u, v)=(x1, y1)-(x2, y2)$. A vector field formed by velocity vectors of change from pixels in the early video frame in time sequence to corresponding pixels in the later video frame in time sequence is the optical flow field of change from the early video frame in time sequence to the later video frame in time sequence.

In an embodiment of this application, when video frames that are adjacent in time are more than two video frames that are adjacent in time, the electronic device may calculate optical flow information between two adjacent video frames in the video frames that are adjacent in time or calculate optical flow information between two video frames that are not adjacent in the video frames that are adjacent in time. For example, if the video frames that are adjacent in time are sequentially x1, x2, and x3 in time sequence, the electronic device may calculate optical flow information between x1 and x2 and optical flow information between x2 and x3, and may further calculate optical flow information between x1 and x3.

In an embodiment of this application, when calculating the optical flow information of change from the early video frame in time sequence to the later video frame in time sequence in the manner for calculating the optical flow information, the electronic device may also determine confidence of the calculated optical flow information. The confidence of the optical flow information corresponds to the optical flow information one to one and is used for representing a credibility degree of the corresponding optical flow information. Higher confidence of the optical flow information indicates more accurate movement information of pixels in an image represented by the calculated optical flow information.

Step S208: Modify, according to the optical flow information, an intermediate image corresponding to the early video time frame to obtain an expected-intermediate image. The intermediate image corresponding to the early video frame may be changed according to the optical flow information to obtain the expected-intermediate image.

Specifically, the electronic device may change pixels included in the intermediate image corresponding to the early video frame in time sequence according to the optical flow information of change from the early video frame in time sequence to the later video frame in time sequence, to obtain an image formed by the changed pixels, that is, distribution of pixel values of an intermediate image anticipated to correspond to the later video frame in time sequence.

In an embodiment of this application, when the video frames that are adjacent in time are more than two video frames that are adjacent in time, the electronic device may change, according to optical flow information between two adjacent video frames in the video frames, an intermediate image corresponding to an early video frame in time sequence in the two adjacent video frames, to obtain an intermediate image anticipated to correspond to a later video frame in time sequence in the two adjacent video frames. For example, the video frames that are adjacent in time are sequentially x1, x2, and x3 in time sequence, and intermediate images of x1, x2, and x3 and output by the neural network model are correspondingly sequentially y1, y2, and y3. Optical flow information of change from x1 to x2 is g1, and optical flow information of change from x2 to x3 is g2. The electronic device may change y1 to z2 according to g1, and change z2 to z3 according to g2. z2 is an intermediate image anticipated to correspond to x2, and z3 is an intermediate image anticipated to correspond to x3.

In an embodiment of this application, the electronic device may alternatively change, according to optical flow information between two video frames that are not adjacent to each other in the video frames, an intermediate image corresponding to an early video frame in time sequence in the two video frames that are not adjacent to each other, to obtain an intermediate image anticipated to correspond to a later video frame in time sequence in the two video frames that are not adjacent to each other. For example, the video frames that are adjacent in time are sequentially x1, x2, and x3 in time sequence, and intermediate images of x1, x2, and x3 and output by the neural network model are correspondingly sequentially y1, y2, and y3. Optical flow information of change from x1 to x3 is g3. The electronic device may change y1 to z3 according to g3, and z3 is an intermediate image anticipated to correspond to x3.

In an embodiment of this application, the electronic device may also use the confidence of the optical flow information as a weight when pixels included in the intermediate image corresponding to the early video frame in time sequence are changed according to corresponding optical flow information, to revise the image formed by the changed pixels.

Step S210: Obtain or determine a time loss between an intermediate image corresponding to the later video frame in time sequence and the expected-intermediate image obtained in step S208.

The time loss may be used for representing a difference between change, in time domain, of the video frames that are adjacent in time and change, in time domain, between images obtained after the video frames that are adjacent in time are processed by the neural network model. Specifically, the electronic device may compare the intermediate image corresponding to the later video frame in time sequence with the image that is obtained after the intermediate image corresponding to the early video frame in time sequence is changed according to the optical flow information of change from the early video frame in time sequence to the later video frame in time sequence, to obtain a difference between the two images, and determine the time loss between the intermediate image corresponding to the later video frame in time sequence and the obtained image according to the difference.

For example, it is assumed that there are two video frames that are adjacent in time, an early video frame in time sequence is $x^{t-1}$, a later video frame in time sequence is $x^t$, and optical flow information of change from $x^{t-1}$ to $x^t$ is $G^t$. $x^{t-1}$ An intermediate image output after $x^{t-1}$ is processed by the neural network model is $y^{t-1}$, and an intermediate image output after $x^t$ is processed by the neural network model is $y^t$. The electronic device may change $y^{t-1}$ according to optical flow information $G^t$ of change from $x^{t-1}$ to $x^t$, to obtain $z^t$. $z^t$ may be used as an image output after processing of the neural network model and anticipated to correspond to the later video frame in time sequence $x^t$. The electronic device may then compare $y^t$ with $z^t$, to obtain a time loss between $y^t$ and $z^t$.

For example, it is assumed that the video frames that are adjacent in time are sequentially x1, x2, and x3 in time sequence, and intermediate images corresponding to x1, x2, and x3 and output by the neural network model are correspondingly sequentially y1, y2, and y3. Optical flow information of change from x1 to x2 is g1, optical flow information of change from x2 to x3 is g2, and optical flow information of change from x1 to x3 is g3. The electronic device may change y1 to z2 according to g1, change z2 to z3 according to g2, and change y1 to z'3 according to g3. z2 is an intermediate image anticipated to correspond to x2. z3 and z'3 are both intermediate images anticipated to correspond to x3. The electronic device may compare y2 with z2, to obtain a time loss between y2 and z2. The electronic device may compare y3 with z3 and compare y3 with z'3, and obtain a time loss between y3 and z3 and a time loss between y3 and z'3 according to weights of z3 and z'3.

Step S212: Obtain or determine a feature loss between the intermediate images corresponding to the plurality of video frames and a target feature image. In one implementation, the feature loss may include a plurality of feature losses.

When the neural network model is used for performing feature conversion on an image, an image feature needing to be converted into is an image feature corresponding to the target feature image. The feature loss is a difference between an image feature corresponding to an intermediate image output by the neural network model and the image feature corresponding to the target feature image. The image feature may be specifically an image color feature, an image light and shadow feature, an image style feature, or the like. Correspondingly, the target feature image may be specifically a target color feature image, a target light and shadow feature image, a target style feature image, or the like. The feature loss between the intermediate image and the target feature image may be specifically a color feature loss, a light and shadow feature loss, a style feature loss, or the like.

Specifically, the electronic device may first determine the image feature that needs to be trained into, obtain an image that satisfies the image feature, and the use the image as the target feature image. The electronic device may then use the neural network model on which training is completed and that is used for extracting the image feature to respectively extract image features corresponding to the intermediate image and the target feature image, then compare the image feature corresponding to the intermediate image and the image feature corresponding to the target feature image, to obtain a difference between the two image features, and determine the feature loss between the intermediate image and the target feature image according to the difference.

For example, it is assumed that the neural network model is used for performing image style feature conversion on an image, a target style feature image is S, there are two video frames that are adjacent in time, an early video frame in time sequence is $x^{t-1}$, and a later video frame in time sequence is $x^t$. $x^{t-1}$ An intermediate image output after $x^{t-1}$ is processed by the neural network model is $y^{t-1}$, and an intermediate image output after $x^t$ is processed by the neural network model is $y^t$. The electronic device may respectively compare $y^{t-1}$ with S and compare $y^t$ with S, to obtain a style feature loss between $y^{t-1}$ and S and a style feature loss between $y^t$ and S.

Step S214: Train the neural network model according to the time loss and the feature loss, and return to step S202 of obtaining a plurality of video frames to continue training until the neural network model satisfies a training finishing condition. In one implementation, training the neural network model may include adjusting values of one or more parameters/operators in the neural network model.

Specifically, a process of training the neural network model is a process of determining nonlinear variation operators corresponding to feature conversion layers in a neural network model that needs to be trained. When the nonlinear variation operators are determined, the electronic device may first initialize the nonlinear variation operators corresponding to the feature conversion layers in the neural network model that needs to be trained, in a subsequent training process, continuously optimize the initialized nonlinear variation operators, and use an optimal nonlinear variation operator obtained through optimization as a nonlinear variation operator of the trained neural network model.

In an embodiment of this application, the electronic device may construct a time domain loss function according to the time loss, construct a spatial domain loss function according to the feature loss, combine the time domain loss function and the spatial domain loss function to obtain a hybrid loss function, and then calculate a changing rate of the hybrid loss function with the nonlinear variation operators corresponding to the feature conversion layers in the neural network model. The electronic device may adjust the nonlinear variation operators corresponding to the feature conversion layers in the neural network model according to the calculated change rate, so that the calculated change rate is reduced, and the neural network model is trained and optimized.

In an embodiment of this application, the training finishing condition may be that a quantity of times of training for the neural network model reaches a preset quantity of times of training. When training the neural network model, the electronic device may count the quantity of times of training. When the preset quantity of times of training is reached, the electronic device may determine that the neural network model satisfies the training finishing condition and finish training the neural network model.

In an embodiment of this application, the training finishing condition may alternatively be that the hybrid loss function satisfies a convergence condition. When training the neural network model, the electronic device may record the changing rate of the hybrid loss function with the nonlinear variation operators corresponding to the feature conversion layers in the neural network model, the rate being calculated after each training is completed. When the calculated change rate gradually approaches to a particular value, the electronic device may determine that the neural network model satisfies the training finishing condition and finish training the neural network model.

In the method for training a neural network model used for image processing, when the neural network model is trained, the time loss and the feature loss are used together as a feedback and adjustment basis to adjust the neural network model, to obtain the neural network model used for image processing through training. When the neural network model is trained, the video frames that are adjacent in time are used as input, and the intermediate image corresponding to the early video frame in time sequence is changed according to the optical flow information of change from the early video frame in time sequence to the later video frame in time sequence, to obtain the intermediate image anticipated to correspond to the later video frame in time sequence, thereby obtaining the time loss. The time loss reflects a loss in time consistency between the intermediate images respectively corresponding to the video frames that are adjacent in time. When the trained neural network model performs feature conversion on a video, time consistency between the video frames of the video is considered, thereby greatly reducing flickering introduced in a feature conversion process, to improve a conversion effect of feature conversion on the video. In addition, calculation of the neural network model and a capability of the processor of the electronic device are combined together to process a video image, thereby improving a calculation speed of the processor without sacrificing a feature conversion effect of the video image, to generate a better neural network model used for image processing.

In an embodiment of this application, in the method for training a neural network model used for image processing, the adjusting the neural network model according to the time loss and the feature loss specifically includes: obtaining content losses between the intermediate images and the input video frames corresponding to the intermediate images; generating a training cost according to the time loss, the feature loss, and the content loss; and adjusting the neural network model according to the training cost.

The content loss refers to a difference in image content between the intermediate images output by the neural network model and the corresponding input video frames. Specifically, the electronic device may use the neural network model on which training is completed and that is used for extracting an image content feature to respectively extract image content features corresponding to the intermediate images and image content features corresponding to the input video frames corresponding to the intermediate images, then compare the image content features corresponding to the intermediate images and the image content features corresponding to the corresponding input video frames, to obtain a difference between the image content features, and determine the content losses between the intermediate images and the corresponding video frames according to the difference.

In an embodiment of this application, the electronic device may construct the time domain loss function according to the time loss, then construct the spatial domain loss function according to both the feature loss and the content loss, and generate the training cost in positive correlation with time domain loss function and in positive correlation with the spatial domain loss function. The electronic device may then calculate a changing rate of the training cost with the nonlinear variation operators corresponding to the feature conversion layers in the neural network model, and adjust the nonlinear variation operators corresponding to the feature conversion layers in the neural network model according to the calculated change rate, so that the calculated change rate is reduced, and the neural network model is trained and optimized.

In an embodiment of this application, the electronic device may also denoise the intermediate images output by the neural network model. Specifically, the electronic device may determine, based on a denoising algorithm for implementing total variation (TV), a TV minimum item used for denoising edge pixels of the intermediate images, and use the TV minimum item in combination with the feature loss and the content loss to construct the spatial domain loss function, to train the neural network model. The manner of denoising an image by using the TV minimum item improves a conversion effect of feature conversion performed by the neural network model on a video.

In this embodiment, when the neural network model is trained, the time loss, the feature loss, and the content loss are used together as a feedback and adjustment basis to adjust the neural network model, to obtain the neural network model used for image processing through training, thereby ensuring accuracy of image feature conversion from three dimensions, namely, time, content, and features and improving a conversion effect of feature conversion performed by the neural network model obtained through training on a video.

In an embodiment of this application, step S210 specifically includes: calculating a difference between values of corresponding pixel positions in the intermediate image corresponding to the later video frame in time sequence and the obtained image, to obtain a differential distribution diagram; and determining the time loss between the intermediate image corresponding to the later video frame in time sequence and the obtained image according to the differential distribution diagram.

Specifically, the differential distribution diagram obtained by the electronic device by calculating the difference between the values of the corresponding pixel positions in the intermediate image corresponding to the later video frame in time sequence and the obtained image may be specifically a pixel value differential matrix. The electronic device may perform a dimensionality reduction operation on the differential distribution diagram, to obtain a time loss value. After the electronic device selects a to-be-used dimensionality reduction operation manner when calculating the time loss for the first time, the selected dimensionality reduction operation manner is used in subsequent time loss calculation. The dimensionality reduction operation may be specifically mean dimensionality reduction or extremum dimensionality reduction. For example, if the pixel value differential matrix is [1, 2, 3, 4], a time loss obtained through a mean dimensionality reduction operation is: $(1+2+3+4)/4=2.5$.

In this embodiment, the time loss between the intermediate image corresponding to the later video frame in time sequence and the obtained image is calculated according to the difference between the pixel values of the corresponding pixel positions in the intermediate image corresponding to the later video frame in time sequence and the obtained image, so that calculation of the time loss is more accurate.

In an embodiment of this application, in the method for training a neural network model used for image processing, the step of obtaining content losses between the intermediate images and the input video frames corresponding to the intermediate images includes: inputting the video frames and the corresponding intermediate images into an evaluation network model; obtaining feature maps corresponding to the video frames and feature maps corresponding to the intermediate images, the feature maps being output by layers included in the evaluation network model; and determining the content losses between the intermediate images and the corresponding video frames according to the feature maps corresponding to the intermediate images and the feature maps corresponding to the corresponding video frames.

The evaluation network model is used for extracting an image feature of an input image. In this embodiment, the evaluation network model may be specifically an Alexnet network model, a visual geometry group (VGG) network model, or a GoogLeNet network. The layers included in the evaluation network model correspond to a plurality of feature extraction factors, and each feature extraction factor extracts different features. The feature map is an image processing result obtained by processing the input image by using the variation operators of the layers in the evaluation network model, the image processing result is an image feature matrix, and the image feature matrix is composed of response values obtained by processing the input image matrix by using the variation operators.

Specifically, after the electronic device inputs the video frames and the corresponding intermediate images into the evaluation network model, the evaluation network model may obtain pixel value matrixes corresponding to the input video frames and pixel value matrixes corresponding to the corresponding intermediate images. The layers included in the evaluation network model perform an operation on the pixel value matrixes corresponding to the input video frames or the intermediate images according to the feature extraction factors corresponding to the layers, to obtain corresponding response values to form the feature maps. Different layers in the evaluation network model extract different features. The electronic device may preset a feature map output by a layer extracting image content features in the evaluation network model as a feature map for content loss calculation. There may be specifically one or more layers extracting image content features in the evaluation network model.

After obtaining the feature maps corresponding to the intermediate images and the feature maps corresponding to the input video frames corresponding to the intermediate images, the electronic device calculates a difference between the pixel values of the corresponding pixel positions in the feature maps corresponding to the intermediate images and the feature maps corresponding to the corresponding video frames, to obtain a content difference matrix between the pixel values, and then performs a dimensionality reduction operation on the content difference matrix to obtain the content loss.

In this embodiment, image content features of a video frame before feature conversion and image content features of the intermediate image after the feature conversion are extracted through the evaluation network model, and the output feature maps from which the image content features are extracted are used to calculate the content loss between correspondingly input images, so that calculation of the content loss is more accurate.

In an embodiment of this application, step S212 specifically includes: inputting the intermediate images and the target feature image into the evaluation network model; obtaining the feature maps corresponding to the intermediate images and a feature map corresponding to the target feature image, the feature maps being output by the layers included in the evaluation network model; and determining the feature losses between the intermediate images and the target feature image according to the feature maps corresponding to the intermediate images and the feature map corresponding to the target feature image.

Specifically, the electronic device may preset a feature map output by a layer extracting image features in the evaluation network model as a feature map for feature loss calculation. There may be specifically one or more layers extracting image features in the evaluation network model. In this embodiment, image features of the target feature image and image features of the intermediate image after the feature conversion are extracted through the evaluation network model, and the feature maps that are output by the evaluation network model and from which the image features are extracted are used to calculate the feature loss between correspondingly input images, so that calculation of the feature loss is more accurate.

In an embodiment of this application, in the method for training a neural network model used for image processing, the step of determining the feature losses between the intermediate images and the target feature image according to the feature maps corresponding to the intermediate images and the feature map corresponding to the target feature image specifically includes: determining feature matrixes corresponding to the intermediate images according to the feature maps corresponding to the intermediate images; determining a feature matrix corresponding to the target feature image according to the feature map corresponding to the target feature image; calculating a difference between values of corresponding positions in the feature matrixes corresponding to the intermediate images and the feature matrix corresponding to the target feature image, to obtain a feature differential matrix; and determining the feature losses between the intermediate images and the target feature image according to the feature differential matrix.

In an embodiment of this application, the neural network model is used for performing image style feature conversion on an image. The feature matrix corresponding to the intermediate image may be specifically a style feature matrix. The style feature matrix is a matrix reflecting an image style feature. The style feature matrix may be specifically a Gram matrix. The electronic device may obtain a corresponding Gram matrix as the style feature matrix corresponding to the intermediate image by obtaining an inner product from a feature map corresponding to the intermediate image, and obtain a corresponding Gram matrix as a style feature matrix corresponding to a target style image by obtaining an inner product of a feature map corresponding to the target style image. The electronic device may then calculate a difference between values of corresponding positions in the style feature matrix corresponding to the intermediate image and the style feature matrix corresponding to the target style image, to obtain a style difference feature matrix, and then perform a dimensionality reduction operation on the style difference feature matrix, to obtain a style feature loss.

In this embodiment, the feature loss between the image obtained through feature conversion and the target feature image is specifically calculated by using the feature matrix capable of reflecting the image feature, so that calculation of the feature loss is more accurate.

For example, the electronic device may select a VGG-19 network model as the evaluation network model. The network model includes 16 convolution layers and 5 pooling layers. Experiments show that features extracted by the fourth convolution layer of the model can represent image content features, and features extracted by the first convolution layer, the second convolution layer, the third convolution layer, and the fourth convolution layer of the model can represent image style features. The electronic device may obtain feature maps corresponding to intermediate images output by the fourth convolution layer and feature maps corresponding to input video frames corresponding to the intermediate images, and calculate content losses between the intermediate images and the corresponding video frames based on the obtained feature maps. The electronic device may obtain feature maps corresponding to intermediate images output by the first convolution layer, the second convolution layer, the third convolution layer, and the fourth convolution layer and feature maps corresponding to input video frames corresponding to the intermediate images, and calculate style feature losses between the intermediate images and the corresponding video frames based on the obtained feature maps.

In an embodiment of this application, in the method for training a neural network model used for image processing, the adjusting the neural network model according to the training cost includes: determining, according to a reverse sequence of layers included in the neural network model, a changing rate of the training cost with nonlinear variation operators corresponding to the layers; and adjusting, according to the reverse sequence, the nonlinear variation operators corresponding to the layers included in the neural network model, so that the changing rate of the training cost with the correspondingly adjusted nonlinear variation operators corresponding to the layers is reduced.

Specifically, after the image is input into the neural network model, nonlinear variation is performed each time the image passes a layer, and an output operation result is used as input of a next layer. The electronic device may determine, from the last layer included in the neural network model according to a sequence of the layers included in the neural network model, a changing rate of the training cost with a nonlinear variation operator corresponding to the current layer, and then determine, according to a reverse sequence, a changing rate of the training cost with a nonlinear variation operator corresponding to each layer. The electronic device may then sequentially adjust, according to the reverse sequence, the nonlinear variation operators corresponding to the layers included in the neural network model, so that the changing rate of the training cost with the correspondingly adjusted nonlinear variation operators corresponding to the layers is reduced.

For example, it is assumed that the training cost is L, according to the sequence of the layers included in the neural network model, a nonlinear variation operator corresponding to the first layer in the reverse sequence is z, and a changing rate of L with z is ∂L/∂z; a nonlinear variation operator corresponding to the second layer in the reverse sequence is b, and a changing rate of L with b is (∂L/∂b) •(∂b/∂z); a nonlinear variation operator corresponding to the third layer in the reverse sequence is c, and a changing rate of L with c is (∂L/∂c) •(∂c/∂b) •(∂b/∂z). When the change rate is solved, gradients are conducted to a previous layer layer-by-layer in a chain derivation. When the change rate is solved in the reverse sequence for the first layer included neural network model, the electronic device may sequentially adjust, according to the reverse sequence, the nonlinear variation operators z, b, and c to the nonlinear variation operator corresponding to the first layer (that is, the last layer in the reverse sequence) included in the neural network model, so that the change rate obtained for the last layer in the reverse sequence is reduced.

In an embodiment of this application, the training cost may be specifically represented as:

$$L_{hybrid} = \sum_{i \in (t-1,t)} L_{spatial}(x^i, y^i, s) + \lambda L_{temporal}(y^t, y^{t-1}) \quad (1)$$

$L_{hybrid}$ represents the training cost, $L_{spatial}$ ($x^i$, $y^i$, s) represents the spatial domain loss function, $L_{temporal}$ ($y^t$, $y^{t-1}$) represents the time domain loss function generated by the time loss, and $\lambda$ is a weight corresponding to the time domain loss function. The spatial domain loss function may be specifically represented as:

$$L_{spatial}(x^i, y^i, s) = \alpha \sum_l L^l_{content}(x^i, y^i) + \beta \sum_l L^l_{style}(s, y^i) + \gamma R_{tv} \quad (2)$$

l represents a layer that extracts an image feature in the evaluation network model, $$\sum_l L^l_{content}(x^i, y^i)$$

represents a content loss between an image input into the neural network model and an image output from the neural network model, $$\sum_l L^l_{style}(s, y^i)$$

represents a feature loss between the image output from the neural network model and the target feature image, $R_{tv}$ represents a TV minimum item, and $\alpha$, $\beta$, and $\gamma$ are weights corresponding to losses. For example, a value of $\alpha$ may be 1, a value of $\beta$ may be 1, and a value of $\gamma$ may be $10^4$.

In this embodiment, the changing rate of the training cost with the nonlinear variation operators corresponding to the layers of the neural network model is solved through counterpropagation, and the calculated change rate is reduced by adjusting the nonlinear variation operators corresponding to the layers of the neural network model, to train the neural network model, so that an effect of image conversion performed by the neural network model obtained through training is better.

Figure 3:
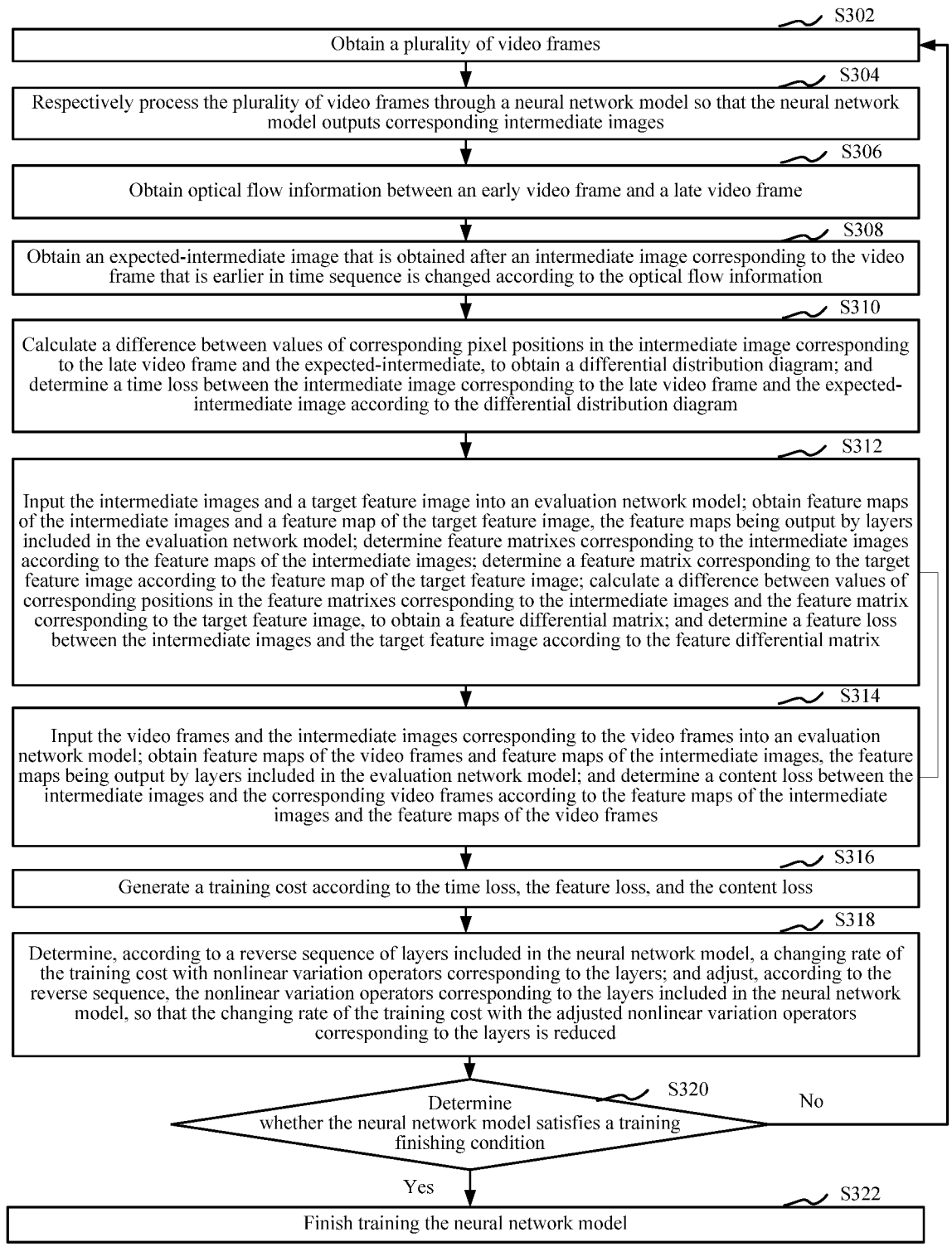
FIG. 3 is a schematic flowchart of a method for training a neural network model used for image processing according to another embodiment of this disclosure.

As shown in FIG. 3, in a specific embodiment of this application, a method for training a neural network model used for image processing specifically includes the following steps.

Step S302: Obtain a plurality of video frames that is adjacent in time.

Step S304: Respectively process the plurality of video frames through a neural network model so that the neural network model outputs corresponding intermediate images.

Step S306: Obtain optical flow information from an early video frame in time sequence to a later video frame in time sequence.

Step S308: Obtain an expected-intermediate image that is obtained after an intermediate image corresponding to the early video frame in time sequence is changed according to the optical flow information.

Step S310: Calculate a difference between values of corresponding pixel positions in the intermediate image corresponding to the later video frame and the expected-intermediate, to obtain a differential distribution diagram; and determine a time loss between the intermediate image corresponding to the later video frame and the expected-intermediate image according to the differential distribution diagram.

Step S312: Input the intermediate images and a target feature image into an evaluation network model; obtain feature maps of the intermediate images and a feature map of the target feature image, the feature maps being output by layers included in the evaluation network model; determine feature matrixes corresponding to the intermediate images according to the feature maps of the intermediate images; determine a feature matrix corresponding to the target feature image according to the feature map of the target feature image; calculate a difference between values of corresponding positions in the feature matrixes corresponding to the intermediate images and the feature matrix corresponding to the target feature image, to obtain a feature differential matrix; and determine feature losses between the intermediate images and the target feature image according to the feature differential matrix.

Step S314: Input the video frames and the intermediate images corresponding to the video frames into an evaluation network model, so that layers of the evaluation network model outputs feature maps of the video frames and feature maps of the intermediate images; obtain the feature maps of the video frames and the feature maps of the intermediate images; and determine a content loss between the intermediate images and the corresponding video frames according to the feature maps of the intermediate images and the feature maps of the video frames.

Step S316: Generate a training cost according to the time loss, the feature loss, and the content loss.

Step S318: Determine, according to a reverse sequence of layers included in the neural network model, a changing rate of the training cost with nonlinear variation operators corresponding to the layers; and adjust, according to the reverse sequence, the nonlinear variation operators corresponding to the layers included in the neural network model, so that the changing rate of the training cost with the adjusted nonlinear variation operators corresponding to the layers is reduced.

Step S320: Determine whether the neural network model satisfies a training finishing condition; if the neural network model satisfies the training finishing condition, perform step S322; if the neural network model does not satisfy the training finishing condition, perform step S302.

Step S322: Finish training the neural network model.

In this embodiment, when the neural network model used for image processing is trained, the time loss, the feature loss, and the content loss are used together as a feedback and adjustment basis to adjust the neural network model, to train the neural network model from three dimensions, namely, time, features, and content, thereby improving a training effect of the neural network model.

Figure 4:
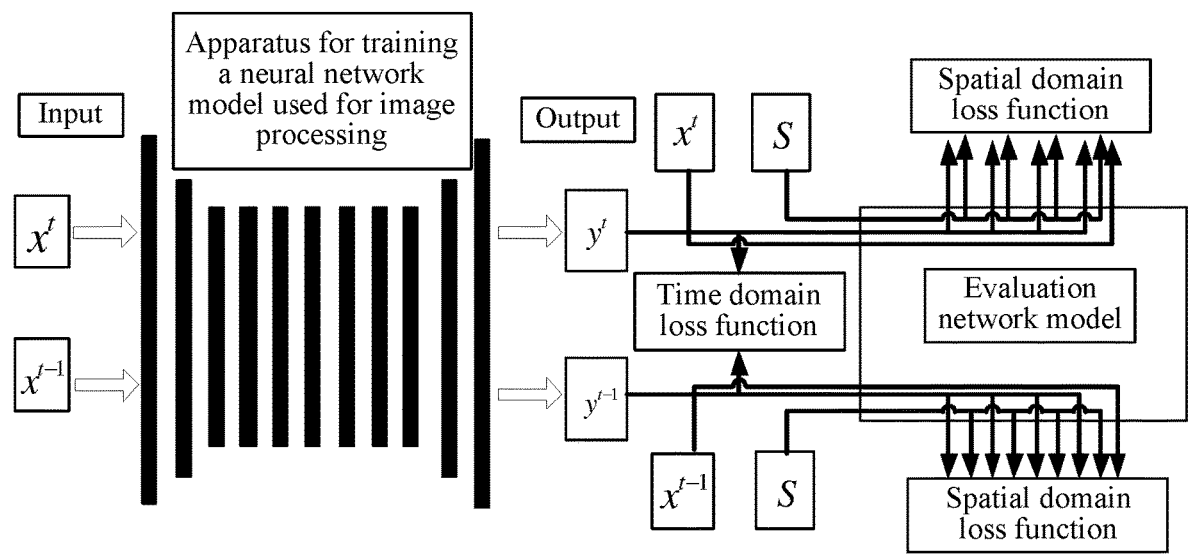
FIG. 4 is a diagram of a training architecture of a neural network model used for image processing according to an embodiment of this disclosure.

FIG. 4 is a diagram of a training architecture of a neural network model used for image processing according to an embodiment of this application. Referring to FIG. 4, the neural network model in this embodiment includes three convolution layers, five residual modules, two deconvolution layers, and one convolution layer. The electronic device may respectively input a video frame $x^{t-1}$ that is earlier in time sequence and a video frame $x^t$ that is later in time sequence into the neural network model, to obtain intermediate images $y^{t-1}$ and $y^t$ a y output from the neural network model. The electronic device may obtain time domain loss functions of $y^{t-1}$ and $y^t$ according to optical flow information between $x^{t-1}$ and $x^t$, and then input $x^{t-1}$, $x^t$, $y^{t-1}$, $y^t$, and a target feature image S into the evaluation network model, to obtain a content loss between $x^{t-1}$ and $y^{t-1}$, a content loss between $x^t$ and $y^t$, a feature loss between $y^{t-1}$ and S, and a feature loss between $y^t$ and S by using the feature maps output by the layers included in the evaluation network model, to obtain the spatial domain loss function.

In an embodiment of this application, after completing training the neural network model according to the method for training a neural network model used for image processing, the electronic device may use the neural network model for video feature conversion. The electronic device may segment a video on which feature conversion needs to be performed into video frames that are adjacent in time, sequentially input the video frames that are obtained through segmentation into the neural network model on which training is completed, after the video frames are processed by the neural network model, obtain output images after the feature conversion corresponding to the video frames, and then merge the output images according to a chronological order of the corresponding input video frames, to obtain the video after the feature conversion. The neural network model may simultaneously perform feature conversion on a plurality of video frames.

Figure 5:
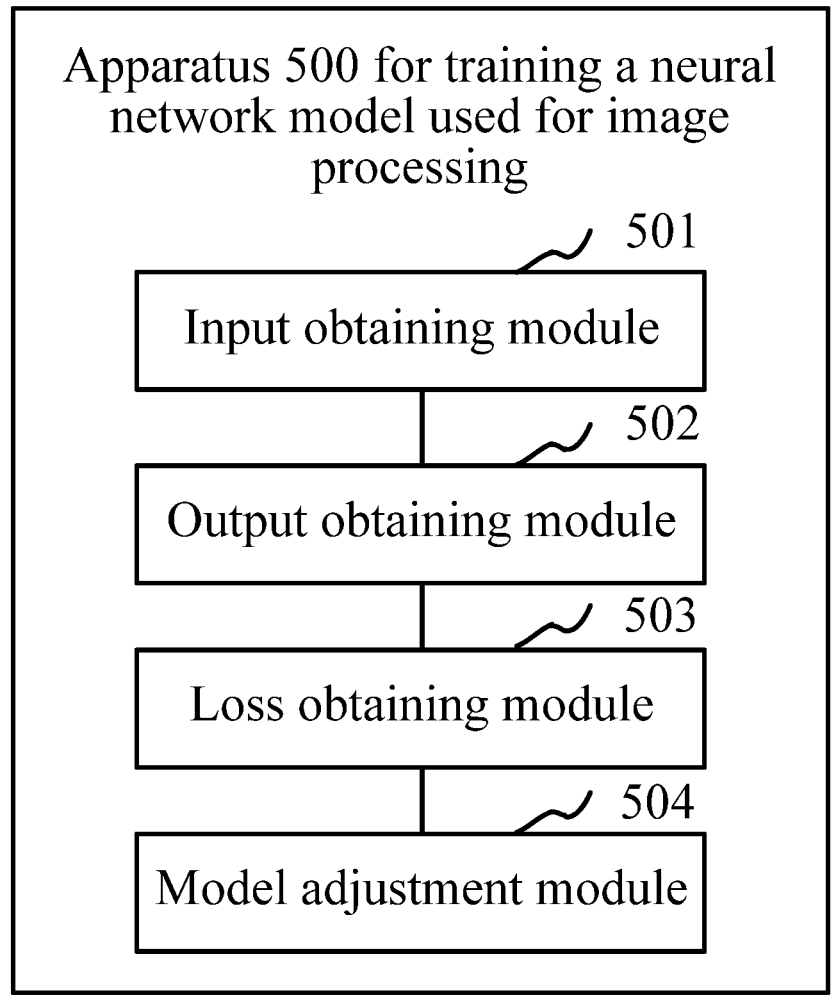
FIG. 5 is a structural block diagram of an apparatus for training a neural network model used for image processing according to an embodiment of this disclosure.

As shown in FIG. 5, an embodiment of this application provides an apparatus 500 for training a neural network model used for image processing. The apparatus specifically includes: an input obtaining module 501, an output obtaining module 502, a loss obtaining module 503, and a model adjustment module 504.

The input obtaining module 501 is configured to obtain a plurality of video frames.

The output obtaining module 502 is configured to respectively process the plurality of video frames through a neural network model so that the neural network model outputs intermediate images corresponding to the plurality of video frames.

The loss obtaining module 503 is configured to: obtain optical flow information of change from an early video frame in time sequence to a later video frame in time sequence in the plurality of video frames that is adjacent in time; obtain an expected-intermediate image that is obtained after an intermediate image corresponding to the early video frame in time sequence is changed according to the optical flow information; obtain a time loss between an intermediate image corresponding to the later video frame in time sequence and the expected-intermediate image; and obtain a feature loss between the intermediate images corresponding to the plurality of video frames and a target feature image.

The model adjustment module 504 is configured to: adjust the neural network model according to the time loss and the feature loss, and return to the step of obtaining a plurality of video frames to continue training until the neural network model satisfies a training finishing condition.

In an embodiment of this application, the model adjustment module 504 is further configured to: obtain the content loss between the intermediate images corresponding to the plurality of video frames and the corresponding video frames; generate a training cost according to the time loss, the feature loss, and the content loss; and adjust the neural network model according to the training cost.

In this embodiment, when the neural network model is trained, the time loss, the feature loss, and the content loss are used together as a feedback and adjustment basis to adjust the neural network model, to obtain the neural network model used for image processing through training, thereby ensuring accuracy of image feature conversion from three dimensions, namely, time, content, and features and improving a conversion effect of feature conversion performed by the neural network model obtained through training on a video.

In an embodiment of this application, the model adjustment module 504 is further configured to: input the intermediate images and the video frames corresponding to the intermediate images into an evaluation network model; obtain feature maps corresponding to the video frames and feature maps corresponding to the intermediate images, the feature maps being output by layers included in the evaluation network model; and determine the content losses between the intermediate images and the corresponding video frames according to the feature maps corresponding to the intermediate images and the feature maps corresponding to the video frames.

In this embodiment, image content features of a video frame before feature conversion and image content features of the intermediate image after the feature conversion are extracted through the evaluation network model, and the output feature maps from which the image content features are extracted are used to calculate the content loss between correspondingly input images, so that calculation of the content loss is more accurate.

In an embodiment of this application, the model adjustment module 504 is further configured to: determine, according to a reverse sequence of layers included in the neural network model, a changing rate of the training cost with nonlinear variation operators corresponding to the layers; and adjust, according to the reverse sequence, the nonlinear variation operators corresponding to the layers included in the neural network model, so that the changing rate of the training cost with the correspondingly adjusted nonlinear variation operators corresponding to the layers is reduced.

In this embodiment, the changing rate of the training cost with the nonlinear variation operators corresponding to the layers of the neural network model is solved through counterpropagation, and the calculated change rate is reduced by adjusting the nonlinear variation operators corresponding to the layers of the neural network model, to train the neural network model, so that an effect of image conversion performed by the neural network model obtained through training is better.

In an embodiment of this application, the loss obtaining module 503 is further configured to: calculate a difference between values of corresponding pixel positions in the intermediate image corresponding to the later video frame in time sequence and the obtained image, to obtain a differential distribution diagram; and determine the time loss between the intermediate image corresponding to the later video frame in time sequence and the obtained image according to the differential distribution diagram.

In this embodiment, the time loss between the intermediate image corresponding to the later video frame in time sequence and the obtained image is calculated according to the difference between the pixel values of the corresponding pixel positions in the intermediate image corresponding to the later video frame in time sequence and the obtained image, so that calculation of the time loss is more accurate.

In an embodiment of this application, the loss obtaining module 503 is further configured to: input the intermediate images and the target feature image into the evaluation network model; obtain the feature maps corresponding to the intermediate images and a feature map corresponding to the target feature image, the feature maps being output by the layers included in the evaluation network model; and determine the feature losses between the intermediate images and the target feature image according to the feature maps corresponding to the intermediate images and the feature map corresponding to the target feature image.

In this embodiment, image features of the target feature image and image features of the intermediate image after the feature conversion are extracted through the evaluation network model, and the output feature maps from which the image features are extracted are used to calculate the feature loss between correspondingly input images, so that calculation of the feature loss is more accurate.

In an embodiment of this application, the loss obtaining module 503 is further configured to: determine feature matrixes corresponding to the intermediate images according to the feature maps corresponding to the intermediate images; determine a feature matrix corresponding to the target feature image according to the feature map corresponding to the target feature image; calculate a difference between values of corresponding positions in the feature matrixes corresponding to the intermediate images and the feature matrix corresponding to the target feature image, to obtain a feature differential matrix; and determine the feature losses between the intermediate images and the target feature image according to the feature differential matrix.

In this embodiment, the feature loss between the image obtained through feature conversion and the target feature image is specifically calculated by using the feature matrix capable of reflecting the image feature, so that calculation of the feature loss is more accurate.

Figure 6:
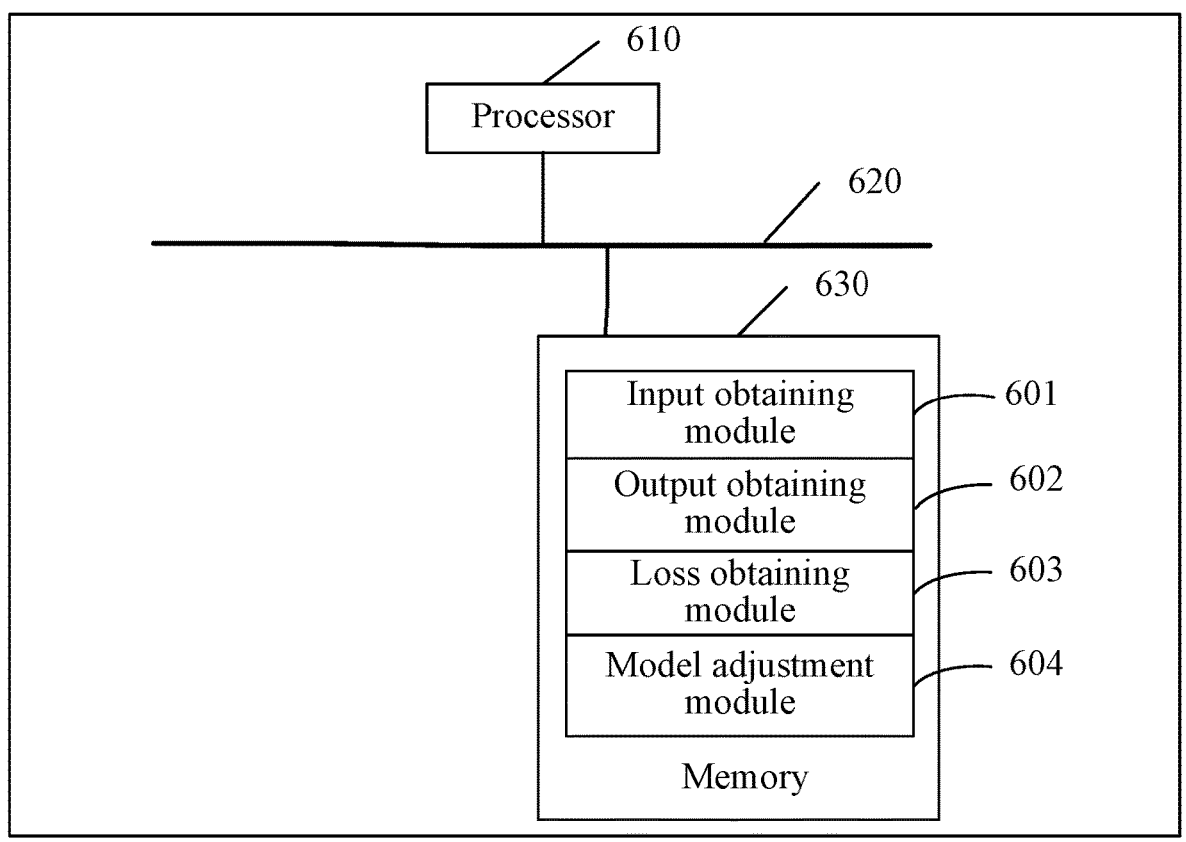
FIG. 6 is another structural block diagram of an apparatus for training a neural network model used for image processing according to an embodiment of this disclosure.

FIG. 6 is another structural block diagram of an apparatus for training a neural network model used for image processing according to an embodiment of this application. As shown in FIG. 6, the apparatus includes: a processor 610 and a memory 630 connected to the processor 610 through a bus 620. The memory 630 stores a machine readable instruction module that can be executed by the processor 610. The machine readable instruction module includes: an input obtaining module 601, an output obtaining module 602, a loss obtaining module 603, and a model adjustment module 604.

The input obtaining module 601 is configured to obtain a plurality of video frames that is adjacent in time.

The output obtaining module 602 is configured to respectively process the plurality of video frames through a neural network model so that the neural network model outputs corresponding intermediate images.

The loss obtaining module 603 is configured to: obtain optical flow information of change from an early video frame in time sequence to a later video frame in time sequence in the plurality of video frames that is adjacent in time; obtain an image that is obtained after an intermediate image corresponding to the early video frame in time sequence is changed according to the optical flow information; obtain a time loss between an intermediate image corresponding to the later video frame in time sequence and the obtained image; and obtain feature losses between the intermediate images corresponding to the plurality of video frames that is adjacent in time and a target feature image.

The model adjustment module 604 is configured to: adjust the neural network model according to the time loss and the feature loss, and return to the step of obtaining a plurality of video frames that is adjacent in time to continue training until the neural network model satisfies a training finishing condition.

In this embodiment of this application, specific functions of the input obtaining module 601, the output obtaining module 602, the loss obtaining module 603, and the model adjustment module 604 are the same as those of the input obtaining module 501, the output obtaining module 502, the loss obtaining module 503, and the model adjustment module 504 and are not described herein again.

In the apparatus for training a neural network model used for image processing, when the neural network model is trained, the time loss and the feature loss are used together as a feedback and adjustment basis to adjust the neural network model, to obtain the neural network model used for image processing through training. When the neural network model is trained, the video frames that are adjacent in time are used as input, and the intermediate image corresponding to the early video frame in time sequence is changed according to the optical flow information of change from the early video frame in time sequence to the later video frame in time sequence, to obtain the intermediate image anticipated to correspond to the later video frame in time sequence, thereby obtaining the time loss. The time loss reflects a loss in time consistency between the intermediate images respectively corresponding to the video frames that are adjacent in time. When the trained neural network model performs feature conversion on a video, time consistency between the video frames of the video is considered, thereby greatly reducing flickering introduced in a feature conversion process, to improve a conversion effect of feature conversion on the video. In addition, calculation of the neural network model and a capability of the processor of the electronic device are combined together to process a video image, thereby improving a calculation speed of the processor without sacrificing a feature conversion effect of the video image, to generate a better neural network model used for image processing.

A person of ordinary skill in the art may understand that all or some of the processes of the methods in the foregoing embodiments may be implemented by a computer program instructing relevant hardware. The program may be stored in a non-volatile computer-readable storage medium. When the program runs, the procedures of the foregoing method embodiments are performed. The storage medium may be a magnetic disc, an optical disc, a read-only memory (ROM), or the like.

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only show several implementations of this application and are described in detail, but they should not be construed as a limit to the scope of this application. It should be noted that a person of ordinary skill in the art may make various changes and improvements without departing from the ideas of this application, which shall all fall within the protection scope of this application. Therefore, the protection scope of this application shall be subject to the appended claims.

What is claimed is:

1. A method for training a neural network model used for image processing, the method comprising:

obtaining, by an electronic device comprising a memory storing instructions and a processor in communication with the memory, a plurality of video frames comprising an early video frame and a later video frame, wherein the early video frame is earlier in time than the later video frame;

inputting, by the electronic device, the plurality of video frames through a neural network model so that the neural network model outputs intermediate images corresponding to the plurality of video frames;

obtaining, by the electronic device, optical flow information between the early video frame and the later video frame;

modifying, by the electronic device according to the optical flow information, an intermediate image output from the neural network model and corresponding to the early video time frame to obtain an expected-intermediate image;

determining, by the electronic device, a time loss between an intermediate image output from the neural network model and corresponding to the later video frame and the expected-intermediate image;

determining, by the electronic device, a feature loss between each of the intermediate images corresponding to the plurality of video frames and a target feature image; and training, by the electronic device, the neural network model according to the time loss and the feature loss, and returning to the act of obtaining a plurality of video frames to continue training until the neural network model satisfies a training finishing condition.

2. The method according to claim 1, wherein the training, by the electronic device, the neural network model according to the time loss and the feature loss comprises:

determining, by the electronic device, a content loss between the intermediate images corresponding to the plurality of video frames and the corresponding video frames;

generating, by the electronic device, a training cost according to the time loss, the feature loss, and the content loss; and training, by the electronic device, the neural network model according to the training cost.

3. The method according to claim 2, wherein the determining, by the electronic device, the content loss between the intermediate images corresponding to the plurality of video frames and the corresponding video frames comprises:

inputting, by the electronic device, the intermediate images corresponding to the plurality of video frames and the corresponding video frames into an evaluation network model, so that the evaluation network model outputs feature maps of the intermediate images and feature maps of the video frames;

obtaining, by the electronic device, the feature maps of the intermediate images and the feature maps of the video frames; and determining, by the electronic device, the content loss between the intermediate images and the video frames according to the feature maps of the intermediate images and the feature maps of the video frames.

4. The method according to claim 2, wherein the training, by the electronic device, the neural network model according to the training cost comprises:

determining, by the electronic device according to a reverse sequence of layers comprised in the neural network model, a changing rate of the training cost with nonlinear variation operators corresponding to the layers comprised in the neural network model; and adjusting, by the electronic device according to the reverse sequence, the nonlinear variation operators corresponding to the layers comprised in the neural network model, so that the changing rate of the training cost with the adjusted nonlinear variation operators is reduced.

5. The method according to claim 1, wherein the determining, by the electronic device, the time loss between the intermediate image corresponding to the later video frame and the expected-intermediate image comprises:
   calculating, by the electronic device, a difference between values of corresponding pixel positions in the intermediate image corresponding to the later video frame and the expected-intermediate image, to obtain a differential distribution diagram; and
   determining, by the electronic device, the time loss between the intermediate image corresponding to the later video frame and the expected-intermediate image according to the differential distribution diagram.

6. The method according to claim 1, wherein the determining, by the electronic device, the feature loss between the intermediate images corresponding to the plurality of video frames and the target feature image comprises:
   inputting, by the electronic device, the intermediate images and the target feature image into an evaluation network model, so that the evaluation network model outputs feature maps of the intermediate images and a feature map of the target feature image;
   obtaining, by the electronic device, the feature maps of the intermediate images and the feature map of the target feature image; and
   determining, by the electronic device, the feature loss between the intermediate images and the target feature image according to the feature maps of the intermediate images and the feature map of the target feature image.

7. The method according to claim 6, wherein the determining, by the electronic device, the feature loss between the intermediate images and the target feature image according to the feature maps of the intermediate images and the feature map of the target feature image comprises:
   determining, by the electronic device, feature matrixes corresponding to the intermediate images according to the feature maps of the intermediate images;
   determining, by the electronic device, a feature matrix corresponding to the target feature image according to the feature map of the target feature image;
   calculating, by the electronic device, a difference between values of corresponding positions in the feature matrixes corresponding to the intermediate images and the feature matrix corresponding to the target feature image, to obtain a feature differential matrix; and
   determining, by the electronic device, the feature loss between the intermediate images and the target feature image according to the feature differential matrix.

8. An apparatus for training a neural network model used for image processing, the apparatus comprising:
   a memory storing instructions;
   a processor in communication with the memory, wherein, when the instructions are executed by the processor, the processor is configured to cause the apparatus to:
      obtain a plurality of video frames comprising an early video frame and a later video frame, wherein the early video frame is earlier in time than the later video frame;
      input the plurality of video frames through a neural network model so that the neural network model outputs intermediate images corresponding to the plurality of video frames;
      obtain optical flow information between the early video frame and the late video frame;
      modify, according to the optical flow information, an intermediate image output from the neural network model and corresponding to the early video time frame to obtain an expected-intermediate image;
      determine a time loss between an intermediate image output from the neural network model and corresponding to the later video frame and the expected-intermediate image;
      determine a feature loss between each of the intermediate images corresponding to the plurality of video frames and a target feature image; and
      train the neural network model according to the time loss and the feature loss, and return to the step of obtaining a plurality of video frames to continue training until the neural network model satisfies a training finishing condition.

9. The apparatus according to claim 8, wherein, when the processor is configured to cause the apparatus to train the neural network model according to the time loss and the feature loss, the processor is configured to cause the apparatus to:
   determine a content loss between the intermediate images corresponding to the plurality of video frames and the corresponding video frames;
   generate a training cost according to the time loss, the feature loss, and the content loss; and
   adjust the neural network model according to the training cost.

10. The apparatus according to claim 9, wherein, when the processor is configured to cause the apparatus to determine the content loss between the intermediate images corresponding to the plurality of video frames and the corresponding video frames, the processor is configured to cause the apparatus to:
   input the intermediate images corresponding to the plurality of video frames and the corresponding video frames into an evaluation network model, so that the evaluation network model outputs feature maps of the intermediate images and feature maps of the video frames;
   obtain the feature maps of the intermediate images and the feature maps of the video frames; and
   determine the content loss between the intermediate images and the video frames according to the feature maps of the intermediate images and the feature maps of the video frames.

11. The apparatus according to claim 9, wherein, when the processor is configured to cause the apparatus to train the neural network model according to the training cost, the processor is configured to cause the apparatus to:
   determine, according to a reverse sequence of layers comprised in the neural network model, a changing rate of the training cost with nonlinear variation operators corresponding to the layers comprised in the neural network model; and
   adjust, according to the reverse sequence, the nonlinear variation operators corresponding to the layers comprised in the neural network model, so that the changing rate of the training cost with the adjusted nonlinear variation operators is reduced.

12. The apparatus according to claim 8, wherein, when the processor is configured to cause the apparatus to determine the time loss between the intermediate image corresponding to the later video frame and the expected-intermediate image, the processor is configured to cause the apparatus to:

calculate a difference between values of corresponding pixel positions in the intermediate image corresponding to the later video frame and the expected-intermediate image, to obtain a differential distribution diagram; and determine the time loss between the intermediate image corresponding to the later video frame and the expected-intermediate image according to the differential distribution diagram.

13. The apparatus according to claim 8, wherein, when the processor is configured to cause the apparatus to determine the feature loss between the intermediate images corresponding to the plurality of video frames and the target feature image, the processor is configured to cause the apparatus to:

input the intermediate images and the target feature image into an evaluation network model, so that the evaluation network model outputs feature maps of the intermediate images and a feature map of the target feature image;

obtain the feature maps of the intermediate images and the feature map of the target feature image; and determine the feature loss between the intermediate images and the target feature image according to the feature maps of the intermediate images and the feature map of the target feature image.

14. The apparatus according to claim 13, wherein, when the processor is configured to cause the apparatus to determine the feature loss between the intermediate images and the target feature image according to the feature maps of the intermediate images and the feature map of the target feature image, the processor is configured to cause the apparatus to:

determine feature matrices corresponding to the intermediate images according to the feature maps of the intermediate images;

determine a feature matrix corresponding to the target feature image according to the feature map of the target feature image;

calculate a difference between values of corresponding positions in the feature matrices corresponding to the intermediate images and the feature matrix corresponding to the target feature image, to obtain a feature differential matrix; and determine the feature loss between the intermediate images and the target feature image according to the feature differential matrix.

15. A non-transitory computer readable storage medium, storing machine readable instructions, and wherein, when the machine readable instructions are executed by a processor, the machine readable instructions cause the processor to perform the following steps:

obtaining a plurality of video frames comprising an early video frame and a later video frame, wherein the early video frame is earlier in time than the later video frame;

inputting the plurality of video frames through a neural network model so that the neural network model outputs intermediate images corresponding to the plurality of video frames;

obtaining optical flow information between the early video frame and the later video frame;

modifying, according to the optical flow information, an intermediate image output from the neural network model and corresponding to the early video time frame to obtain an expected-intermediate image;

determining a time loss between an intermediate image output from the neural network model and corresponding to the later video frame and the expected-intermediate image;

determining a feature loss between each of the intermediate images corresponding to the plurality of video frames and a target feature image; and training the neural network model according to the time loss and the feature loss, and returning to the step of obtaining a plurality of video frames to continue training until the neural network model satisfies a training finishing condition.

16. The non-transitory computer readable storage medium according to claim 15, wherein, the machine readable instructions cause the processor to perform training the neural network model according to the time loss and the feature loss, the machine readable instructions cause the processor to perform the following steps:

obtaining a content loss between the intermediate images corresponding to the plurality of video frames and the corresponding video frames;

generating a training cost according to the time loss, the feature loss, and the content loss; and training the neural network model according to the training cost.

17. The non-transitory computer readable storage medium according to claim 16, wherein, the machine readable instructions cause the processor to perform determining the content loss between the intermediate images corresponding to the plurality of video frames and the corresponding video frames, the machine readable instructions cause the processor to perform the following steps:

inputting the intermediate images corresponding to the plurality of video frames and the corresponding video frames into an evaluation network model, so that the evaluation network model outputs feature maps of the intermediate images and feature maps of the video frames;

obtaining the feature maps of the intermediate images and the feature maps of the video frames; and determining the content loss between the intermediate images and the video frames according to the feature maps of the intermediate images and the feature maps of the video frames.

18. The non-transitory computer readable storage medium according to claim 16, wherein, the machine readable instructions cause the processor to perform training the neural network model according to the training cost, the machine readable instructions cause the processor to perform the following steps:

determining, according to a reverse sequence of layers comprised in the neural network model, a changing rate of the training cost with nonlinear variation operators corresponding to the layers comprised in the neural network model; and adjusting, according to the reverse sequence, the nonlinear variation operators corresponding to the layers comprised in the neural network model, so that the changing rate of the training cost with the adjusted nonlinear variation operators is reduced.

19. The non-transitory computer readable storage medium according to claim 15, wherein, the machine readable instructions cause the processor to perform determining the time loss between the intermediate image corresponding to the later video frame and the expected-intermediate image, the machine readable instructions cause the processor to perform the following steps:

calculating a difference between values of corresponding pixel positions in the intermediate image corresponding to the later video frame and the expected-intermediate image, to obtain a differential distribution diagram; and determining the time loss between the intermediate image corresponding to the later video frame and the expected-intermediate image according to the differential distribution diagram.

20. The non-transitory computer readable storage medium according to claim 15, wherein, the machine readable instructions cause the processor to perform determining the feature loss between the intermediate images corresponding to the plurality of video frames and the target feature image, the machine readable instructions cause the processor to perform the following steps:
   inputting the intermediate images and the target feature image into an evaluation network model, so that the evaluation network model outputs feature maps of the intermediate images and a feature map of the target feature image;
   obtaining the feature maps of the intermediate images and the feature map of the target feature image; and
   determining the feature loss between the intermediate images and the target feature image according to the feature maps of the intermediate images and the feature map of the target feature image.

\* \* \* \* \*